(12) United States Patent
Atwood

(10) Patent No.: US 6,852,369 B1
(45) Date of Patent: Feb. 8, 2005

(54) METHOD FOR PREVENTION OF SOLID DISSOLUTION THROUGH COVALENT LIGAND BONDING

(75) Inventor: David Allan Atwood, Lexington, KY (US)

(73) Assignee: University of Kentucky Research Foundation, Lexington, KY (US)

(*) Notice: Subject to any disclaimer, the term of this patent is extended or adjusted under 35 U.S.C. 154(b) by 0 days.

(21) Appl. No.: 10/656,569

(22) Filed: Sep. 5, 2003

Related U.S. Application Data

(60) Provisional application No. 60/408,324, filed on Sep. 5, 2002.

(51) Int. Cl.[7] .................................................. B05D 1/18
(52) U.S. Cl. ..................... 427/435; 427/421; 427/430.1; 148/271; 148/243
(58) Field of Search ............................. 427/421, 430.1, 427/435, 428; 148/243, 240, 270, 271

(56) References Cited

U.S. PATENT DOCUMENTS

| | | |
|---|---|---|
| 4,039,446 A | 8/1977 | Ban et al. |
| 4,281,086 A | 7/1981 | Gaul, Jr. et al. |
| 4,433,154 A | 2/1984 | Hirai |
| 4,508,838 A | 4/1985 | Buckl |
| 4,969,995 A | 11/1990 | Jackson et al. |
| 5,073,575 A | 12/1991 | Blanch et al. |
| 5,173,470 A | 12/1992 | Bruening et al. |
| 5,200,473 A | 4/1993 | Jeanneret-Gris |
| 5,766,478 A | 6/1998 | Smith et al. |
| 6,586,600 B2 * | 7/2003 | Atwood et al. ............. 546/323 |

* cited by examiner

*Primary Examiner*—Shrive P. Beck
*Assistant Examiner*—David Turocy
(74) *Attorney, Agent, or Firm*—King & Schickli, PLLC

(57) ABSTRACT

Methods for preventing dissolution of solid substrates, such as metal leaching from coal or corrosion of metal surfaces, are provided. The method comprises coating the solid substrate with a chelate ligand having the general structure:

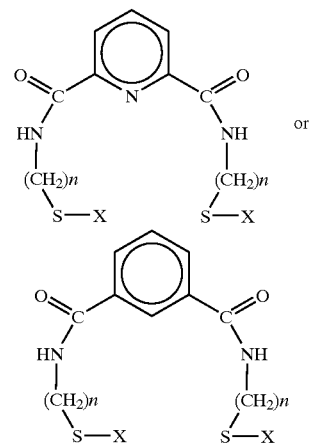

where n is an integer from 1–4, and X is selected from the group consisting of hydrogen, lithium, sodium, potassium, rubidium, cesium, and francium. A method for preventing metal leaching from coal, such as acid mine drainage or metal leachate in runoff from coal refuse piles, is also provided.

12 Claims, 2 Drawing Sheets

METHOD FOR PREVENTION OF SOLID DISSOLUTION THROUGH COVALENT LIGAND BONDING

This application claims the benefit of U.S. Provisional Patent Application Ser. No. 60/408,324, filed Sep. 5, 2002.

TECHNICAL FIELD

The present invention relates to the prevention of dissolution of solids. More specifically, the invention relates to a method for prevention of dissolution of solids by covalent binding of selected molecules to the surface of a solid substrate, and to compositions for carrying out the method.

BACKGROUND OF THE INVENTION

Metal oxidation is a problem in numerous industries. For example, acid mine drainage (AMD) is a severe environmental problem that adversely affects many streams in the United States. Acid mine drainage results from the oxidation of pyrite ($FeS_2$) and other metal sulfides such as HgS. As metal sulfides oxidize, the aqueous environment becomes acidified and rich in a variety of metals including iron, manganese, lead, mercury, and others. Generally, AMD is associated with abandoned mines which fill with water and promote oxidation of metal sulfides therein. In addition to abandoned mines, AMD also occurs in areas surrounding refuse piles of coal which accumulate during the coal cleaning process. Extensive leaching can result from these coal refuse piles, particularly during heavy rainfall or snowfall. There is accordingly a need in the art for methods and compositions for prevention of solid dissolution (leaching) resulting from the above-described processes.

Numerous attempts have been made to address the issue of AMD. For example, it is known to provide on-site treatment plants which treat effluent waters with high doses of lime to precipitate heavy metals. However, use of lime has several drawbacks, including the need for high dosages and the production of secondary wastes such as metal hydroxides and gypsum, which must be ultimately sent to landfills.

It is also known to coat pyritic surfaces using microencapsulation technology to retard pyrite oxidation (Vandiviere, M. M, Evangelou, V. P.

1998. Comparative testing between conventional and microencapsulation approaches to controlling pyrite oxidation. *J. Geo. ExpL*. 64, 161–176; Belzile, N., Maki S., Chen Y., Goldsack D. 1997. Inhibition of pyrite oxidation by surface treatment. *Sci. Tot. Env.*, 196, 177–186; Evangelou V. P. 2001. Pyrite microencapsulation technologies: Principles and Potential Field Application. *Eco. Eng.* 17, 165–178; all incorporated herein by reference). This technology emphasizes the use of rock phosphate, phosphate, potassium hydrogen phosphate, or silica-based compounds to create a ferric phosphate or ferric silica complex around the pyrite that prevents pyrite oxidation from either oxygen or iron (III). Similar studies have been performed using other phosphate minerals such as hydroxyapatite and fluoroapatite to complex and precipitate Fe(II). For phosphate coatings to be effective, it is necessary to use an oxidizing precursor such as peroxide prior to introduction of a phosphate salt. In the case of phosphate mineral usage, major drawbacks include the fact that as the phosphate complexes form at the surface of the coal it renders the phosphate source inactive, thereby shortening the overall effectiveness of the procedure. Additionally, it is necessary to maintain the pH above 4 for optimal performance. Use of phosphate or rock phosphate to control pyrite oxidation ultimately results in the liberation of large amounts of sulfur which, under reducing conditions, may lead to formation of sulfuric acid. In the presence of an oxygen source, sulfate may form.

Accordingly, there is a need in the art for suitable methods for preventing dissolution and oxidation of metal-containing solids such as pyrite (coal) and metal or metal-coated surfaces. Advantageously, the method should allow binding of metals in the form of a solid-state lattice, rather than requiring binding of free metals, and form stable complexes which remain stable over a range of environmental conditions and over extended periods of time.

SUMMARY OF THE INVENTION

We have demonstrated that certain multidentate sulfur-containing ligands may be used for binding free metals in a liquid or solid matrix (U.S. Pat. No. 6,586,600, incorporated herein in its entirety by reference). Surprisingly, it has been discovered that similar multidentate ligands may be bound to the surface of solid materials, wherein metals bound are contained in a solid-state lattice structure, to prevent dissolution of the solids, for example leaching of metals from the surface of a solid. The method of the present invention therefore has utility in a variety of applications, such as prevention of metal leaching from stored coal and in improving corrosion resistance of, for example, metal materials exposed to outdoor weather conditions.

In accordance with the purposes of the present invention as described herein, in one aspect a method of preventing leaching of metal from a metal-containing solid substrate is provided, beginning with the step of coating the solid with an effective amount of a solution of a chelate ligand having a chemical formula:

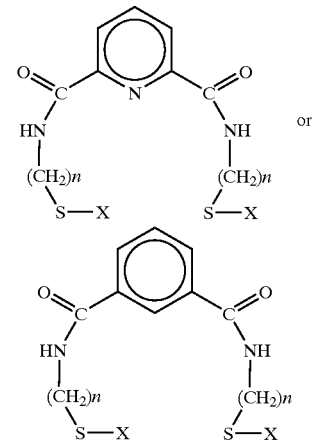

where n=1–4 and X is selected from the group consisting of hydrogen, lithium, sodium, potassium, rubidium, cesium, and francium. Next, the chelate ligand solution is allowed to dry to covalently bind the ligand to the solid substrate. The solid substrate may be coated with chelate ligand solution containing ligand in an amount of from about 0.01 M to about 1.0 M. The solid substrate may be coated with chelate ligand solution by any suitable means, including by immersion, by spraying, by painting, or by misting.

It should be appreciated that the metal in the metal-containing solid substrate may be any metal in or capable of being placed in a positive oxidation state. The metal may be selected from the group consisting of lead, copper, mercury, cadmium, iron, nickel, zinc, aluminum, antimony, arsenic, barium, beryllium, chromium, cobalt, magnesium, manganese, selenium, silver, strontium, thallium, tin, gold, vanadium and any mixtures thereof. Leaching of the metal in the metal-containing solid substrate is prevented at pH values from about 0 to about 14.

In another aspect, a method of preventing leaching of metal from a metal-containing coal substrate is provided, comprising the steps of coating the coal with an effective amount of a solution of a chelate ligand having a chemical formula:

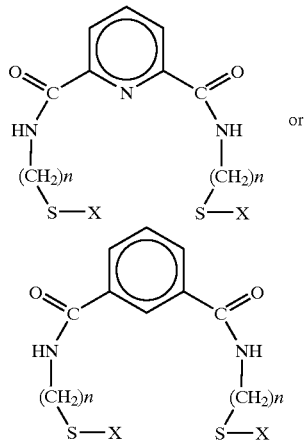

where n=1–4 and X is selected from the group consisting of hydrogen, lithium, sodium, potassium, rubidium, cesium, and francium, and allowing the chelate ligand solution to dry. Any suitable drying means is anticipated, including air drying, drying at temperature, and the like.

As noted supra, the chelate ligand solution may include ligand in an amount of from about 0.01 M to about 1.0 M, and binds any metal in or capable of being placed in a positive oxidation state. Leaching of the metal in the metal-containing coal is prevented at pH values from about 0 to about 14. Any suitable method for coating the coal with the chelate ligand solution is anticipated, including but not limited to immersion, spraying, or misting.

Other objects of the present invention will become apparent to those skilled in this art from the following description wherein there is shown and described a preferred embodiment of this invention, simply by way of illustration of the modes currently best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrates several aspects of the present invention and, together with the description, serves to explain the principles of the invention. In the drawing.

Figure 1:
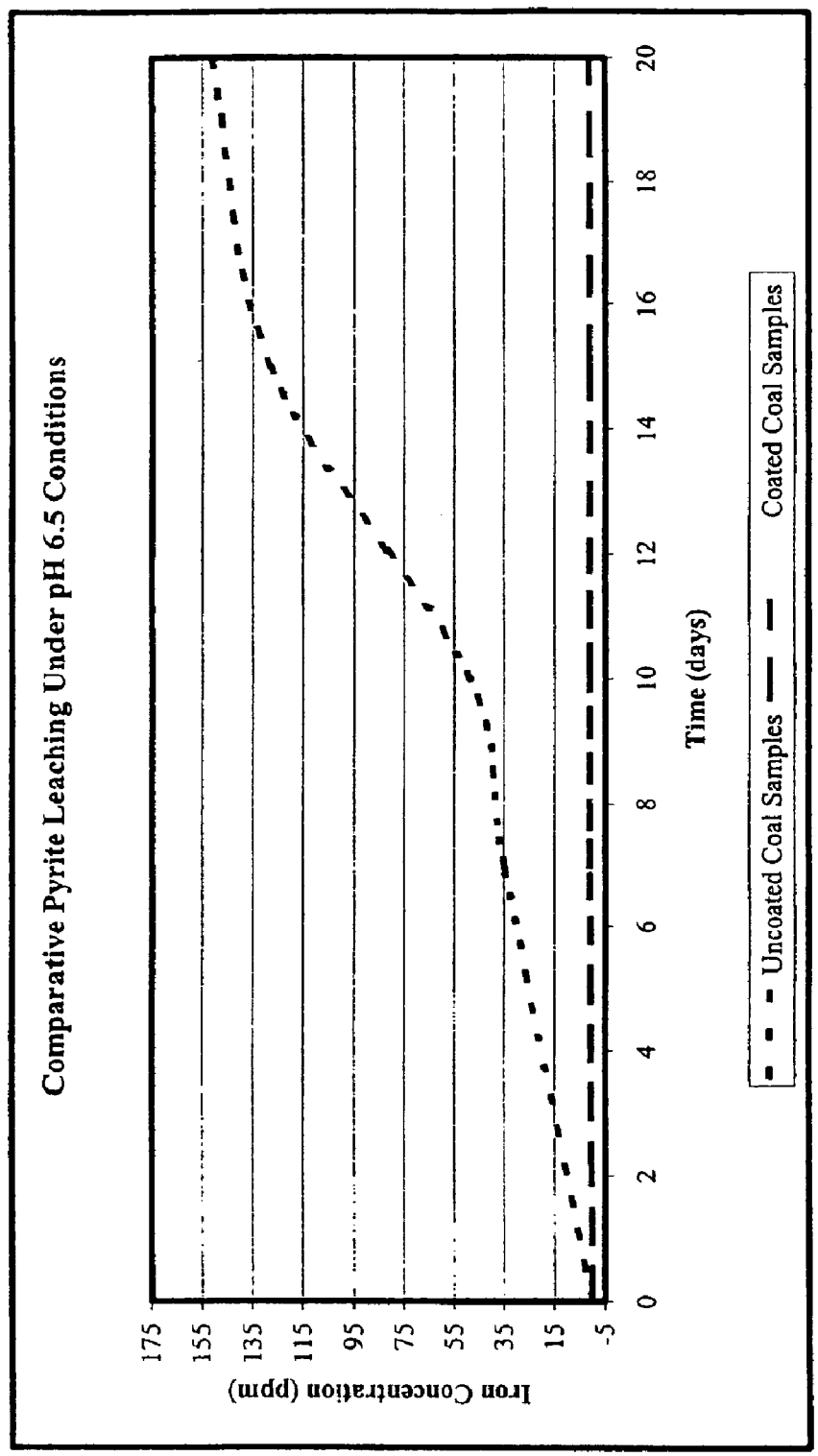
FIG. 1 shows iron (pyrite) leaching in aqueous solution at pH 6.5 for treated and untreated coal samples.

Reference will now be made in detail to the presently preferred embodiments of the invention, examples of which are illustrated in the accompanying drawings.

DETAILED DESCRIPTION OF THE INVENTION

As summarized above, the present invention relates to prevention of leaching of metal from solid substrates using chelate ligands which surprisingly bind metals contained in a solid-state lattice matrix. The ligands of the present invention are suitable for binding metals which are in or are capable of being placed in a positive oxidation state, including cadmium, iron, lead, nickel, zinc, mercury, copper, and the like. In one aspect, the present invention relates to chelate ligands consisting of a ring structure from which depend multiple alkyl chains terminating in sulfur-containing groups. The chelate ligands are of the general formula:

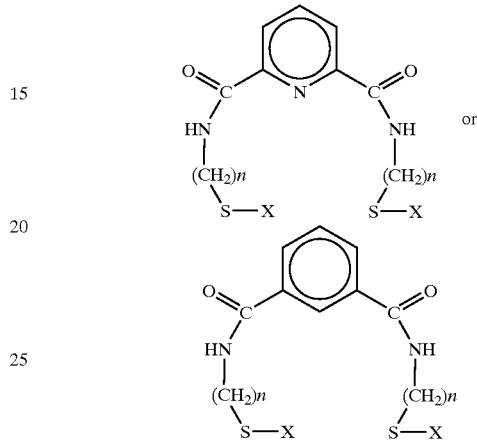

where n is an integer from 1–4, and X is any element selected from the group consisting of H, Li, Na, K, Rb, Cs, and Fr.

The novel ligands of the present invention may be adapted to a variety of environmental situations requiring prevention of metal leachate, such as, e.g. treatment of acid mine drainage, treatment of acid mine drainage/metal leachate from coal refuse piles, prevention of metal leachate resulting from oxidation of metal surfaces such as metal furniture to improve corrosion resistance, and the like. As will be appreciated by those skilled in the art, the chelate ligands of the present invention may be utilized alone or in varying combinations to achieve the objects of the present invention.

The method of the present invention comprises contacting the solid substrate of choice with an effective amount of a solution of a chelate ligand as described above for a sufficient time to form a stable ligand-metal complex. The ligand-metal complexes remain stable at a range of pH values from about 0 to about 14.

The methods of the present invention may be accomplished by various means which are illustrated in the examples below. These examples are intended to be illustrative only, as numerous modifications and variations will be apparent to those skilled in the art.

EXAMPLE 1

Samples of refuse coal known to have an elevated pyrite content were collected from coal refuse piles known to leach 89,000 ppm (approximately 5000 pounds) of iron from an average flow of 43,200 gallons per day. The refuse coal was also known to have an elevated content of other metals, including manganese, zinc, copper, and others, as well as an average daily level of 21,000 ppm sulfate. The disodium salt of 1,3-benzenediamidoethanthiol ($Na_2BDET$), prepared substantially as described in our U.S. Pat. No. 6,586,600, was used to evaluate the ability of one embodiment of the composition of the present invention to reduce metal leaching under conditions simulative of acid mine drainage.

Duplicate coal samples having an average mass of 15.97 grams were selected. Treated coal samples were immersed for 10 minutes in a 0.11 M solution of $Na_2BDET$ to coat them with the compositions of the present invention, and were air-dried for a period of 30 minutes prior to initiation of leaching experiments. Control samples were not coated with the compositions of this invention.

Three sets of aqueous leaching treatments were used to test the ability of the present invention to reduce oxidation and leaching of metals from coal refuse samples: (1), deionized water (500 g) at pH 6.5; (2) deionized water (500 g) adjusted to pH 3.0 using sulfuric acid; and (3) oxidizing conditions established by bubbling air through an aqueous solution (pH 3.0 as described above). Treated and untreated coal samples were immersed in the above solutions and maintained at ambient temperature and normal atmospheric pressure for 20 days. Aliquots of 10 mL were collected and filtered (0.2 μm Nalgene® syringe filters) at intervals of 7, 10, 15, and 20 days.

Figure 2:
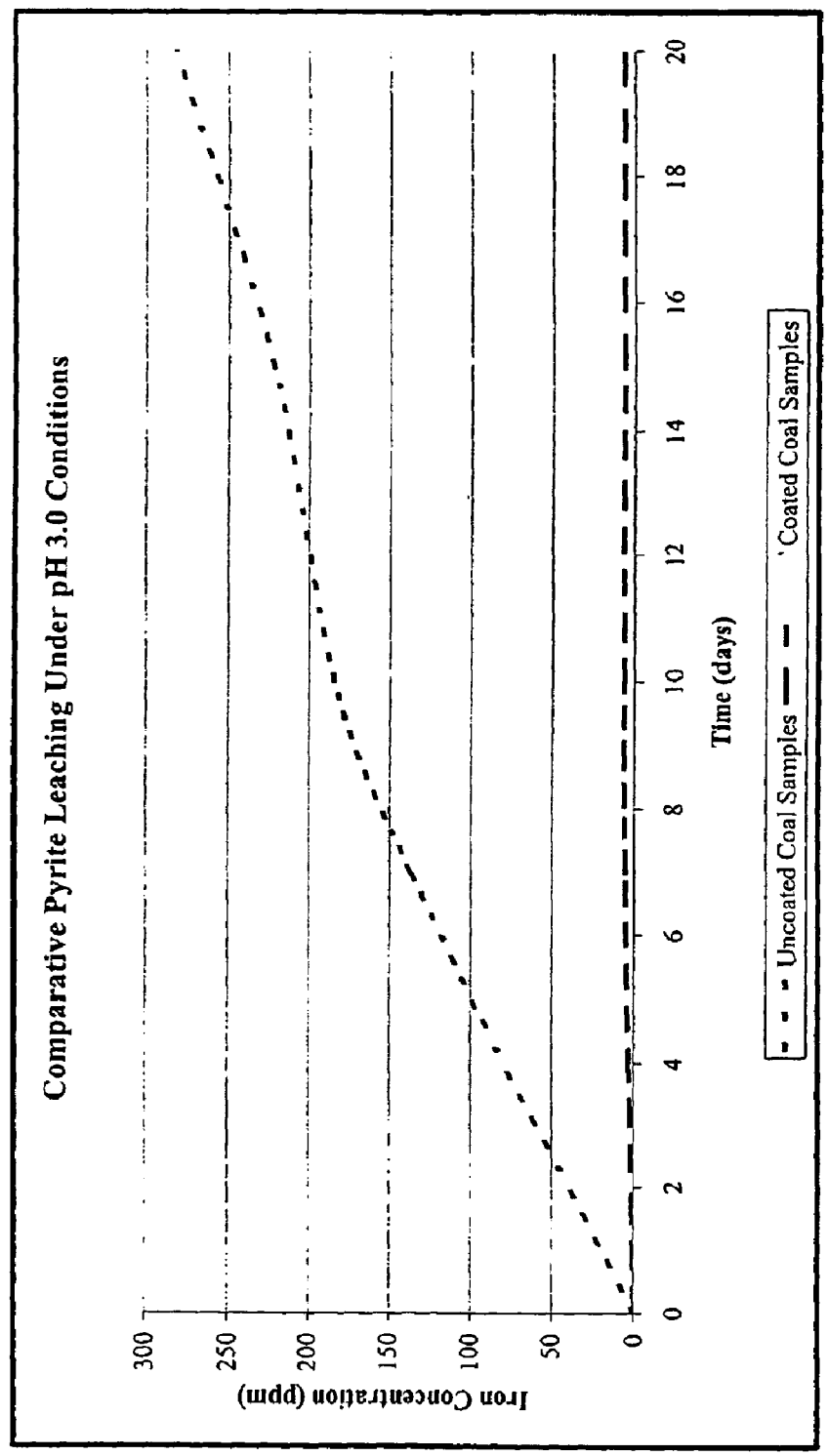
FIG. 2 shows iron (pyrite) leaching in aqueous solution at pH 3.0 for treated and untreated coal samples.

The aliquots were then analyzed for total metals to evaluate leaching. Metal leaching analyses were conducted by Inductive Coupled Plasma Optical Emission Spectrometry using a 1999 Thermo Jarrell Ash Duo HR Iris Advanced Inductive Coupled Plasma Optical Emission Spectrometer. Mercury analysis was conducted using cold vapor fluorescence spectroscopy (CVAF) on a 1994 V 12000 Varsal Atomic Fluorescence Spectrometer. For each analyzed aliquot, corrections were made for water evaporation in the experimental treatment. Each experiment was repeated at least three times. Results are presented in Tables 1–4 and FIGS. 1 and 2.

TABLE 1

Average metal leaching of ligand-coated coal samples at pH 6.5.

| | Average Metal Concentration (ppm) | | | |
|---|---|---|---|---|
| Metal | 7 days | 10 days | 15 days | 20 days |
| Cd | <0.008* | <0.008* | <0.008* | <0.008* |
| Co | <0.002* | 0.008 | 0.140 | 0.127 |
| Cu | <0.009* | <0.009* | <0.009* | <0.009* |
| Fe | 1.01 | 1.01 | 1.01 | 1.01 |
| Pb | <0.020* | <0.020* | <0.020* | <0.020* |
| Mn | 0.260 | 0.272 | 0.361 | 0.428 |
| Ni | <0.005 | <0.005 | <0.005 | 0.123 |
| Zn | <0.002* | 0.482 | 0.903 | 0.911 |
| Hg | <0.0005** | <0.0005** | <0.0005** | <0.0005** |

*Concentration fell below the ICP-OES method detection limit.
**Concentration fell below the CVAF method detection limit.

TABLE 2

Average metal leaching of uncoated coal samples at pH 6.5.

| | Average Metal Concentration (ppm) | | | |
|---|---|---|---|---|
| Metal | 7 days | 10 days | 15 days | 20 days |
| Cd | <0.008* | <0.008* | <0.008* | <0.008* |
| Co | 0.411 | 0.517 | 0.639 | 0.725 |
| Cu | <0.009* | 0.394 | 0.405 | 2.25 |
| Fe | 35.0 | 48.6 | 128 | 151 |
| Pb | <0.020* | <0.020* | <0.020* | <0.020* |
| Mn | 0.693 | 0.789 | 0.982 | 1.13 |
| Ni | 0.468 | 0.513 | 0.555 | 0.667 |
| Zn | 1.86 | 2.69 | 3.82 | 4.43 |
| Hg | <0.0005** | <0.0005** | <0.0005** | <0.0005** |

*Concentration fell below the ICP-OES method detection limit.
**Concentration fell below the CVAF method detection limit.

TABLE 3

Average metal leaching of ligand-coated coal samples at pH 3.0.

| | Average Metal Concentration (ppm) | | | |
|---|---|---|---|---|
| Metal | 7 days | 10 days | 15 days | 20 days |
| Cd | <0.008* | <0.008* | <0.008* | <0.008* |
| Co | 0.478 | 0.529 | 0.545 | 0.549 |
| Cu | <0.009* | <0.009* | <0.009* | <0.009* |
| Fe | 5.77 | 6.68 | 6.77 | 6.88 |
| Pb | <0.020* | <0.020* | <0.020* | <0.020* |
| Mn | 0.199 | 0.333 | 0.441 | 0.549 |
| Ni | 1.29 | 1.44 | 1.50 | 1.71 |
| Zn | 0.152 | 0.480 | 0.366 | 0.572 |
| Hg | <0.0005** | <0.0005** | <0.0005** | <0.0005** |

*Concentration fell below the ICP-OES method detection limit.
**Concentration fell below the CVAF method detection limit.

TABLE 4

Average metal leaching of uncoated coal samples at pH 3.0.

| | Average Metal Concentration (ppm) | | | |
|---|---|---|---|---|
| Metal | 7 days | 10 days | 15 days | 20 days |
| Cd | <0.008* | <0.008* | <0.008* | <0.008* |
| Co | 0.487 | 0.617 | 0.783 | 1.17 |
| Cu | 1.15 | 1.33 | 1.42 | 1.47 |
| Fe | 137 | 184 | 222 | 259 |
| Pb | <0.020* | <0.020* | <0.020* | <0.020* |
| Mn | 1.31 | 2.520 | 3.14 | 4.67 |
| Ni | 0.594 | 1.33 | 1.68 | 2.47 |
| Zn | 1.76 | 3.37 | 4.05 | 5.70 |
| Hg | <0.0005** | <0.0005** | <0.0005** | <0.0005** |

*Concentration fell below the ICP-OES method detection limit.
**Concentration fell below the CVAF method detection limit.

ICP-OES analysis confirmed that in pH solutions of 6.5 and 3.0, coating the coal samples with the composition of the present invention significantly reduced metal leaching. For pH 6.5 aqueous solution, iron leaching was 35.0 times greater (after 7 days) and 150 times greater (after 20 days) in uncoated samples than in coated samples (see Tables 1 and 2 and FIG. 1). For the pH 3.0 aqueous solution, it was determined that iron leaching was 23.7 times greater after 7 days and 41.0 times greater after 20 days in uncoated samples (see Tables 3 and 4 and FIG. 2). Under oxidizing conditions at pH 3.0, coating the samples reduced iron leaching by 63.3% after 7 days and 66.4% after 20 days. Significant reduction in leaching of other metals such as Mn, Cu, Co, Ni, and the like were also obtained by coating coal samples with the composition of this invention.

EXAMPLE 2

Heavy rainfall was simulated by placing coal samples treated as described above under a dripping column containing an aqueous solution (pH 3.0). An average of 500 g of the acidified aqueous solutions were dripped daily over the coal samples for a total of 20 days. Following the testing period, 20 mL aliquots were collected and filtered as described above. Total metals were analyzed using ICP-OES and CVAF as described. Each experiment was repeated at least 3 times. As shown in Table 5, coating the samples reduced iron leaching by 86.8% after 20 days.

TABLE 5

Comparative 20 day average metal leaching under acidic rainfall conditions.

| | Average Metal Concentration (ppm) | |
|---|---|---|
| Metal | Uncoated coal | Coated coal |
| Cd | <0.008* | <0.008* |
| Co | 0.282 | 0.078 |
| Cu | 1.51 | 0.532 |
| Fe | 117 | 15.4 |
| Pb | <0.020* | <0.020* |
| Mn | 4.00 | 0.47 |
| Ni | 1.06 | 0.313 |
| Zn | 36.5 | 3.82 |
| Hg | <0.0005** | <0.0005** |

*Concentration fell below the ICP-OES method detection limit.
**Concentration fell below the CVAF method detection limit.

The foregoing description of preferred embodiments of the invention has been presented for purposes of illustration and description. It is not intended to be exhaustive or to limit the invention to the precise form disclosed. Obvious modifications or variations are possible in light of the above teachings. The embodiments were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A method of preventing leaching of metal from a metal-containing solid substrate, comprising the steps of:

coating the substrate with an effective amount of a solution of a chelate ligand having a chemical formula:

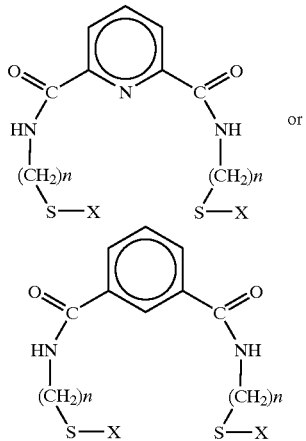

where n=1–4 and X is selected from the group consisting of hydrogen, lithium, sodium, potassium, rubidium, cesium, and francium; and allowing the chelate ligand solution to dry.

2. The method of claim 1, wherein the chelate ligand solution contains ligand in an amount of from about 0.01 M to about 1.0 M.

3. The method of claim 1, wherein the metal in the metal-containing solid substrate may be any metal in or capable of being placed in a positive oxidation state.

4. The method of claim 3, wherein the metal in the metal-containing solid substrate is selected from a group consisting of lead, copper, mercury, cadmium, iron, nickel, zinc, aluminum, antimony, arsenic, barium, beryllium, chromium, cobalt, magnesium, manganese, selenium, silver, strontium, thallium, tin, gold, vanadium and mixtures thereof.

5. The method of claim 1, wherein leaching of the metal in the metal-containing solid substrate is prevented at pH values from about 0 to about 14.

6. The method of claim 1, wherein the solid substrate is coated with the chelate ligand by immersion, by spraying, by painting, or by misting.

7. A method of preventing leaching of metal from a metal-containing coal substrate, comprising the steps of:

coating the coal with an effective amount of a solution of a chelate ligand having a chemical formula:

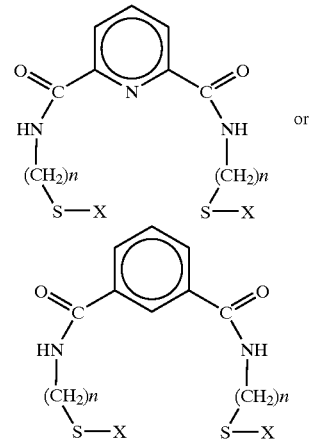

where n=1–4 and X is selected from the group consisting of hydrogen, lithium, sodium, potassium, rubidium, cesium, and francium; and allowing the chelate ligand solution to dry.

8. The method of claim 7, wherein the chelate ligand solution contains ligand in an amount of from about 0.01 M to about 1.0 M.

9. The method of claim 7, wherein the metal in the metal-containing coal may be any metal in or capable of being placed in a positive oxidation state.

10. The method of claim 9, wherein the metal in the metal-containing coal is selected from a group consisting of lead, copper, mercury, cadmium, iron, nickel, zinc, aluminum, antimony, arsenic, barium, beryllium, chromium, cobalt, magnesium, manganese, selenium, silver, strontium, thallium, tin, gold, vanadium and mixtures thereof.

11. The method of claim 7, wherein leaching of the metal in the metal-containing coal is prevented at pH values from about 0 to about 14.

12. The method of claim 7, wherein the coal is coated with the chelate ligand by immersion, by spraying, or by misting.

* * * * *